US012663547B2

(12) United States Patent
Stutz et al.

(10) Patent No.: US 12,663,547 B2
(45) Date of Patent: Jun. 23, 2026

(54) SCANNING MEASURING DEVICE WITH FIBER NETWORK

(71) Applicant: HEXAGON INNOVATION HUB GMBH, Heerbrugg (CH)

(72) Inventors: Reto Stutz, Au (CH); Jürg Hinderling, Marbach (CH); Florian Engeler, Goldach (CH)

(73) Assignee: HEXAGON INNOVATION HUB GMBH, Heerbrugg (CH)

( * ) Notice: Subject to any disclaimer, the term of this patent is extended or adjusted under 35 U.S.C. 154(b) by 502 days.

(21) Appl. No.: 18/229,073

(22) Filed: Aug. 1, 2023

(65) Prior Publication Data

US 2024/0118421 A1 Apr. 11, 2024

(30) Foreign Application Priority Data

Aug. 2, 2022 (EP) .................................... 22188321

(51) Int. Cl.
| | |
|---|---|
| *G01S 17/89* | (2020.01) |
| *G01S 7/481* | (2006.01) |
| *G01S 7/4865* | (2020.01) |
| *G01S 17/894* | (2020.01) |

(52) U.S. Cl.
CPC .......... *G01S 17/894* (2020.01); *G01S 7/4818* (2013.01); *G01S 7/4865* (2013.01)

(58) Field of Classification Search
None
See application file for complete search history.

(56) References Cited

U.S. PATENT DOCUMENTS

| | | | |
|---|---|---|---|
| 6,115,112 | A | 9/2000 | Hertzman et al. |
| 10,340,651 | B1 * | 7/2019 | Drummer ......... H01S 3/094003 |
| 2017/0155225 | A1 * | 6/2017 | Villeneuve .......... H01S 3/06754 |
| 2019/0120942 | A1 | 4/2019 | Zhang et al. |
| 2019/0154804 | A1 | 5/2019 | Eichenholz |

FOREIGN PATENT DOCUMENTS

| | | |
|---|---|---|
| DE | 102 49 285 A1 | 5/2003 |
| EP | 1 923 721 A1 | 5/2008 |

OTHER PUBLICATIONS

Extended European Search Report dated Jan. 24, 2023 as received in Application No. 22188321.8.

* cited by examiner

*Primary Examiner* — Hovhannes Baghdasaryan
(74) *Attorney, Agent, or Firm* — Maschoff Brennan

(57) ABSTRACT

A laser scanner or laser profiler for scanning of an object surface by measuring of distances to surface points comprising a light pulse source, a transmission unit, a receiving unit for receiving measurement light reflected from the object surfaces and for determining the respective distance to a surface point based on the received measurement light according to the principle of time-of-flight and a fiber network with a fiber based optical coupler being designed for transforming a respective light pulse into a series of spaced sub-pulses of different energies. The sub-pulses are digitally sampled, at least one of the sub-pulses having an energy yielding an electrical signal amplitude in the non-saturated range of the receiving unit is selected, and a respective distance is determined based on deducing a time-of-flight of the at least one selected sub-pulse.

15 Claims, 8 Drawing Sheets

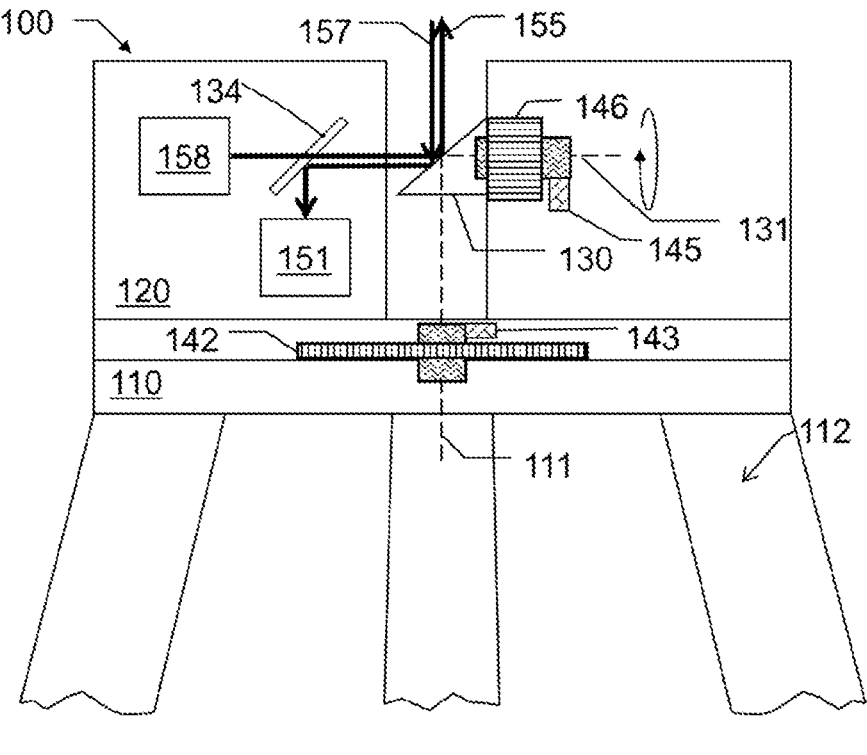
Fig.1a
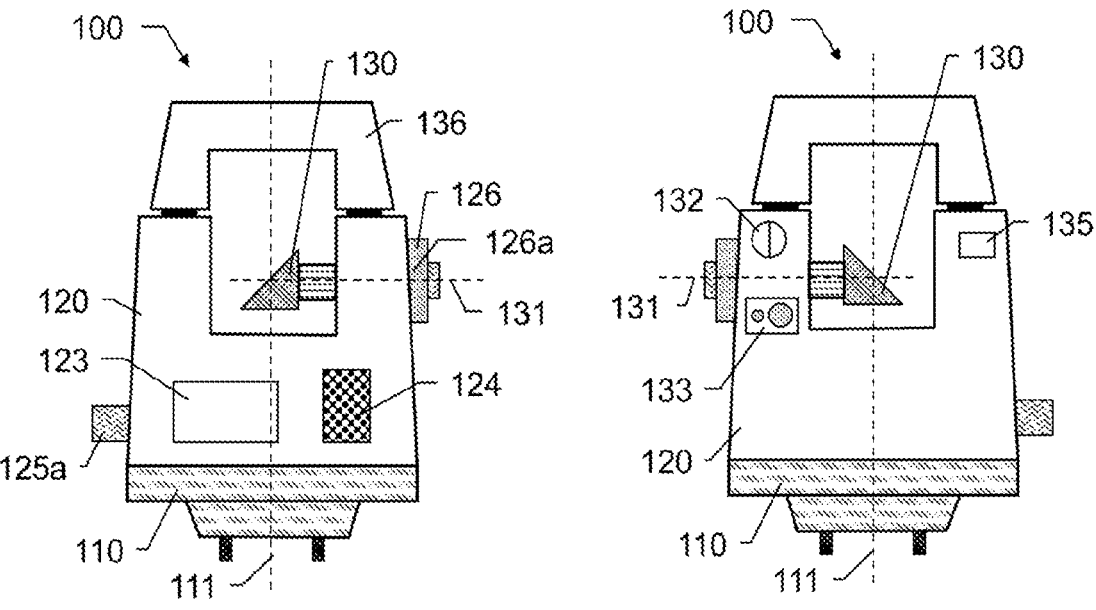
Fig.1b                    Fig.1c

SCANNING MEASURING DEVICE WITH FIBER NETWORK

BACKGROUND

The disclosure relates to a laser scanner or laser profiler and a method for scanning of object surfaces by measuring of distances to surface points according to the independent claims. Laser scanners or laser profilers are used in or known in the field of geodetic or industrial measurement or mobile mapping. Such surveying apparatuses with scanning functionality are denoted, for example, as laser scanners, profilers or total stations such as the Leica RTC360, Leica BLK360, Leica Multi Station 50, Leica Pegasus:Backpack, Leica Pegasus:Two or the Leica BLK2GO which are used to measure or create 3D coordinates of surfaces. For this purpose, they have to be able to guide the measurement beam of a distance measuring instrument along a moving targeting axis continuously over object surfaces within a measurement space, using a direction deflecting unit designed in such a way that the measurement beam is deflected in at least one spatial direction and in the process simultaneously to detect direction and distance with respect to the measurement point on the surface. From the distance and the direction information of the respective targeting axis correlated therewith for each point, 2D- or 3D object point coordinates are compiled and for instance a so-called 3D point cloud may be generated by means of data processing.

When scanning, a distance to a point of a target's surface is determined together with a targeting direction. In the area of electronic or electro-optical distance measurement, various principles and methods are known. One approach consists in emitting pulsed electromagnetic radiation, having for example a wavelength of 405 nm, 532 nm, 635 nm, 650-690 nm, 780 nm or 785 nm, 795 nm, 808-850 nm, 905 nm, 940 nm, 1064 nm, 1320 nm or between 1500 and 1570 nm, for instance in form of laser light, to a target to be surveyed and subsequently receiving an echo from this target as a back-scattering object, the distance to the target to be surveyed being determined on the basis of the transit time of the emitted pulse. As one approach, e.g. known from U.S. Pat. No. 6,115,112, the back-scattered or reflected pulse is digitally sampled, i.e. an emitted signal is detected by sampling the radiation detected by a detector, identifying a signal within the sampled region and finally determining the position thereof. A pulse runtime is determined very accurately from a defined progress point of the sampled and digitized signal, for example, the inflection points, the curve maxima, or integrally by means of an optimum filter known from time interpolation.

A problem thereby is the limited linear modulation range of the electronic receiver circuit. At close range or in case of a high reflectivity of the target object, the signal can saturate the receiver, so that the coding of the transmitted signal is no longer correctly ascertained or the runtime is determined insufficiently accurately. One disadvantage of signal sampling is thus that in the state of a saturated receiving electronics system due to excessively strong received light intensities suitably analyzable items of information of the measurement signal are no longer available, because then an actual signal profile can no longer be established as a result of detector saturation.

The strength of the received signal is influenced as said on the one hand, by the distance range to be covered and, on the other hand, by the differing reflectivity of the surfaces of the object to be measured. For example objects having optically diffuse surfaces where the light is scattered in nearly any directions, the amount of received light by the receiving unit is rather weak. However mirrored or glossy surfaces such as windows or street signs generate rather strong and different signal amplitudes in the electronic receiving unit of the distance meter depending on the angle of incidence of the optical measuring beam. The distance can vary in a large distance range from for instance about a meter to up to kilometers, wherein strongly diffuse light-scattering target objects having extremely little backscatter.

In industrial metrology, the target objects to be scanned are often made of plastic or metal having glossy surfaces, the signal strength of the scattered light back to the distance measuring unit is therefore very low, or excessively strong in the case of reflection directly back. In the first case, the received signal merges into the noise and is not analyzable. In the second case, the receiving channel is overloaded and the distance measurement becomes excessively inaccurate, because the signal runtime of the receiver and/or the signal shape change. In other words, instruments such as laser profilers and laser scanners suffer from their low range of signal dynamic of the electronic receiver channel amongst others because of specular reflective surfaces or high reflective targets such as street signs which cannot be measured accurately, this because of signal saturation due to strong returned optical radiation.

One of the special requirements for such a scanner is therefore a very large setting range from very low to extremely high optical reflectivities of at least $10^5$, yielding a high measurement accuracy preferably in the sub-millimeter range for any amplitude between these two extreme states. Roughly speaking, the scanning measuring device should deliver precise results for the measured distances over signal or amplitude ranges varying over several orders of magnitude.

The main problem is additionally the time necessary to set the required appropriate signal amplitude. In conventional distance measuring devices, the signal setting time is typically 1 ms or longer. By scanning, measuring data is then generated at a rate from 100 kHz up to multiple megahertz, whereby the energy of the reflected signal can strongly vary from point to point because of the fast laser beam rotation. In general, 3D coordinates are presently output or stored at a rate in the MHz range. Because a typical measurement or point rate is somewhere between one to five Mega Points per second, the time between two measurement points is less than 1 microsecond, within such a short time interval it is rather challenging to adjust the signal strength of the returned laser beam. So as not to miss any measuring points on the object to be measured, signal dynamic regulation having a setting speed in the nanosecond range, e.g. at 100 ns or faster is therefore required.

It is known in the art, e.g. by DE 10249285 A1, to adjust the measurement signal in two steps: firstly to measure the initial signal strength of the arriving pulse and calculate a needed attenuation/transmission/amplification, and secondly to set or adjust the degree of attenuation, transmission or amplification somewhere in the emitting or receiving channel. However, using such a probe pulse is highly problematic in scanning instruments where the beam is swiveled very fast as it is rather slow and results in missed scanning points resp. leads to a rather complex scanner.

On the other hand, conventional distance measuring devices having high amplitude dynamic range, in spite of all measures, either the receiving photodiode (APD, PIN) or the electronics of the receiving channel reach their limits. First, the gain of an APD can only be set in a narrow range, and second, the change of the transit time (delay, phase) which is linked to a gain setting cannot be calibrated sufficiently exactly. In particular distance measurement which is high precision, has sub-millimeter accuracy, and at the same time has megahertz speed is thus not possible.

By signal accumulation, the dynamic range can be extended and weak signals sampled by an AD-converter e.g. below 5 lsb can be distinguished from the noise. However, this means a loss in measurement rate compared to single shot measurements without accumulation. For example for single shots measurements and in case of a GHZ-AD-converter with 14 bit, at maximum a signal dynamic of 16000 lsb in the linear receiver range is available which is further reduced by said demand of precision in the sub-millimeter range, whereby a sufficiently high SNR of about 50 lsb is needed (16.000:50=320).

This is to be compared with the demands on the signal dynamic range for sub-millimeter precise distance measuring. As discussed above, there can be strong variation in the reflectivity of possible target objects, e.g. from targets having a black diffuse reflectance with albedo 5% to white with albedo 100% or reflective surfaces such as reflective foils or cat-eye reflectors with even larger values of the reflectance, up to 100 to 1000 or even 20000 more than a white, diffusive surface. Hence, for this reason a dynamic range of 400000 has to be covered. Further, said measurement distance range adds a factor of for example 100 for a distance range of several meters to about 150 m, hence totaling to a needed signal dynamic range of 100*400000=4*10E7.

SUMMARY

Thus, the object of the present disclosure is to provide an improved scanning measuring instrument. In particular it is an object to provide a scanning measuring instrument with high distance measurement accuracy in a wide signal dynamic range. Another object is to enable scanning measurement of highly reflective object surfaces with high geometric and radiometric precision.

The present disclosure relates to terrestrial scanning measuring instrument embodied as a laser scanner or laser profiler for measuring of object surfaces by measuring of distances to surface points. The device comprises a control and processing unit for data processing and for controlling the laser scanner and a light pulse source for generation of light pulses as measurement light. The device further comprises a support structure, in case of a laser scanner preferably pivotable about a vertical or azimuth axis relative to a base of the laser scanner, the base defining the vertical axis. In case of a laser profiler e.g. for mobile mapping, the support structure is for example embodied as a mounting unit to mount the profiler onto a car, a backpack, or roboter dog such as the Boston Dynamics Spot® or any other moving platform.

The device further has a transmission unit for emitting a respective light pulse into free space collimated or focused towards the object surfaces with a beam deflection unit for varying an alignment of an emission direction of the measurement light (and therewith an alignment of a targeting axis), wherein the beam deflection unit is rotatable about at least one axis (e.g. horizontal axis) relative to the support structure). For the typical two-axis scanning movement of a laser scanner, for example there are simultaneous rotations about two orthogonal axes and thus a two-axes variation of the emission or targeting direction. The device further comprises at least one position meter such as an angle encoder for measuring the alignment of the at least one axis, e.g. relative to the support structure and if applicable relative to the base.

Further, the device comprises a receiving unit for receiving measurement light reflected from the object surfaces and a scanning functionality, wherein, when the scanning functionality is carried out in an automatically controlled manner by the control and processing unit, there is scanning with rotating the beam deflection unit about the at least one axis and if applicable pivoting the structure about the vertical axis/relative to the base, measuring the respective distance to surface points based on the received measurement light according to the principle of time-of-flight, measuring the respective alignment of the at least one axis, and generating a point cloud based on the measured distances and alignments.

Further, the laser scanner or laser profiler comprises a first fiber network with a first fiber based optical coupler, i.e. a fiber optic device such as an optical splitter, optical combiner or optical coupler which can distribute the optical signal from one fiber or fiber segment among two or more fibers or fiber segments which fiber (segments) build up or establish the fiber network, or combine the optical signal from two or more fibers (sections) into a single fiber. The first fiber network is designed for transforming a respective light pulse into a series of spaced or separated sub-pulses of different energies, for example a sequence of temporally separated sub-pulses. The control and processing is configured to digitally sample the sub-pulses, to select at least one of the sampled sub-pulses having an energy yielding an electrical signal amplitude in the non-saturated range of the receiving unit, and to determine said respective distance based on deducing a time-of-flight of the at least one selected sub-pulse. As a preferred option, the first fiber network comprises at least one fiber delay line, whereby in some embodiments the fiber coupler and the fiber delay line form a loop for recursive splitting of the light pulse. Hence, by the loop, recurrently a portion of the pulse is split off whereby the energy of successive sub-pulses the pulse thereby is transformed into is different compared to another e.g. the energies are exponentially decreasing as one example.

As another option, a delay line in the transmitter path comprises a fiber switch for temporary interruption of the delay line, therewith, blocking the transmission on the delay line. The switching is preferably controlled by a timing master unit which handles the timing of all relevant modules of the distance measurement system, e.g. the triggering of the laser driver. By blocking the interrupting the optical fiber network the sub-pulse sequence has a well-defined length of N sub-pulses. The emitted measurement radiation comprises exactly N sub-pulses yielding different energies.

As another option, a delay line in the receiver path comprises a fiber switch for temporary or impermanent interruption of the delay line. Therewith, again by blocking the delay line, e.g. the transformation of the initial pulse respectively the generation of a sub-pulse sequence can be interrupted or stopped or a delayed sub-pulse can be blocked, wherefore as an option the fiber switch is triggerable or "openable" in response to a received sub-pulse.

As still another option for embodiments having a delay line, the first fiber network is integrated in a doped-fiber amplifier, in particular a EDFA or YDFA, providing (at least part of) the fiber delay line. For example, the doped-fiber amplifier is a multi-stage amplifier and the fiber delay line is provided by a single mode fiber of its first amplifier stage.

In some embodiments, the transmission unit comprises the first fiber based optical coupler and the first fiber network for transforming a pulse into a temporal series of sub-pulses. Thereby as an option, the fiber network is designed in such a way that the sub-pulses are guided onto the same optical measuring axis collimated versus the surface of the target object. As a general option, the first fiber network is built by single mode fibers.

As another option, the receiving unit comprises a second fiber based optical coupler and a second fiber network, in particular built by multi-mode fibers, for splitting off a fraction of the energy or a pulse portion of a respective received sub-pulse and a variable optical attenuator or a switch in the receiver channel controllable by or in response to the pulse fraction. Hence for example, a receiving channel can be blocked if the energy fraction indicates a sub-pulse which would saturate the detector.

Optionally, the time interval between two subsequent sub-pulses is equal for all sub-pulses of the series and/or longer than the time length of the light pulse and/or at least twice the inverse of an electronic bandwidth of the receiving unit, e.g. a bandwidth of a detector.

The present disclosure also relates to a scanning method for generation of a point cloud by measuring of object surfaces with a laser scanner or laser profiler. The method comprises measuring of distances to surface points using light pulses as measurement light emitted towards the object surfaces into an emission direction which is variable by rotation about at least one axis, and receiving measurement light reflected from the object surfaces, measuring the respective alignment of the at least one axis and measuring the respective distance to a surface point based on the received measurement light.

The method comprises transforming a respective light pulse into a series of separated sub-pulses of different energies by a first fiber based optical coupler and a first fiber network, digitally sampling received sub-pulses, selecting at least one of the sampled sub-pulses having an energy yielding an electrical signal amplitude in the non-saturated range of a receiving unit and determining said respective distance based on deducing a time-of-flight of the at least one selected sub-pulse.

Optionally, the series comprises at least a portion of successive, i.e. temporal subsequent sub-pulses of decreasing energies. That is, at least a cohesive part of the sub-pulse series shows declining energy from sub-pulse to sub-pulse.

Optionally, determining the respective distance is by using exactly one of the received sub-pulses having an energy in a linear modulation range of a receiving unit for receiving said reflected measurement light.

As another option, the series of sub-pulses is shorter than the time between two successive point measurements or is shorter than the inverse of a point measurement rate with which the surface points are measured, whereby preferably the series comprises a distinct number of sub-pulses and/or is as long as a predefined time period.

In further developments, received sub-pulses of a respective light pulse are identifiable as originating of the same light pulse by their temporal spacing being well known.

As another option, there is a subtracting of sub-pulses neighboring the sub-pulse used for distance determination from this sub-pulse for correcting the waveform of this sub-pulse.

The present disclosure also relates to a computer program, which is stored on a machine-readable carrier, or computer data signal having program code, for controlling and/or carrying out the method, in particular when the program is executed in a control and analysis unit of a measuring device.

The present disclosure provides the advantage that the reflected signal in form of a sub-pulse of the group of sub-pulses having different energies can be received in the linear amplitude range of the receiver unit without distortion of the modulation shape and without missing any measurement points which are used in some conventional designs for signal adjustment that rely on pre-knowledge of the surface or object point. In every pulse transformation/modulation sequence at least one sub-pulse is provided per object or measurement point and can be detected without signal distortion i.e. in the linear working range of the receiver. Thus, distance measurement with sub-millimeter precision can be performed over a wide signal amplitude or energy range of the initially generated pulse.

The disclosure provides a larger signal dynamic than instruments or methods known in the art in the sub-microsecond range with its burst-like (sub-)pulse trains, having a time length below the time interval of two scan points. The enlargement without any signal accumulation is for example at least of a factor of 512 or even 1000.

In preferred embodiments, due to a temporal pulse splitting by the fiber network and optical coupler, only a single light source and a single detector is sufficient which is amongst others advantageous regarding calibration.

In other preferred embodiments having a receiver unit which blocks saturated sub-pulses by a second fiber network, e.g. in combination with a transmission unit providing the sub-pulse sequence by the first fiber network, in addition recovery times or dead times of the receiver are avoided.

BRIEF DESCRIPTION OF THE DRAWINGS

The scanning measuring device and the method for scanning will be described in greater detail hereinafter, purely by way of example, with reference to exemplary embodiments depicted schematically in the drawings.

More specifically,

FIGS. 1a-e schematically show laser scanners or profilers as known in the art,

DETAILED DESCRIPTION

Figure 1D:
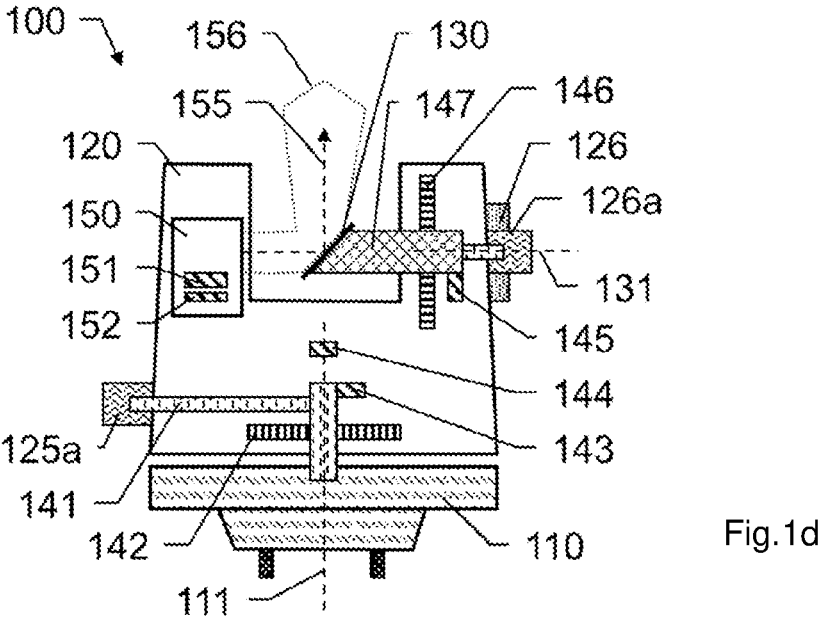

FIG. 1a shows a schematic depiction in cross sectional view of an embodiment of a terrestrial laser scanner 100 as known in the art. The scanner 100 comprises a beam generation unit 158, e.g. a laser diode. Via a beam deflection element (mirror) 134, the generated light impinges a rotating mirror 130, which can be rotated around a tilting axis 131 by a motor 146. The rotational position with respect to tilting axis 131 can be measured by an angle encoder 145. The scanning instrument 100 resp. its upper structure 120 is mounted to a base 110 such that it is rotatable around a bearing axis 111 by another motor 142. The laser scanner comprise another angle encoder 143 configured to provide a bearing angle reading. Alternatively the base 110 might comprise the bearing angle encoder 143. The base 110 can for instance be mounted on a tripod 112 as indicated in the figure for stationary laser scanning or can be mounted onto other fixed or mobile structures, e.g. an automotive for mobile mapping (see also FIG. 1*e* below).

The emission direction of measuring light 155 resp. the targeting direction (indicated by arrow 155) is determined by the state of the tilting axis 131 and bearing axis 111. There are alternative exemplary scanning instruments known in the art with only one beam deflection axis resp. without a structure 120 rotatable relative to a base 110. Such scanners are also known as laser profilers, wherein the beam 155 is deflected by the instrument 100 only about the fast moving axis 131.

In any case, measuring light 157 reflected by an object (point) to be measured is directed to a detector resp. distance measuring module 151 via rotating mirror 130 and beam deflector 131. Based on the well-known principle of time-of-flight, the distance to the object point is then measured and the 3D-position or coordinate of the object point is finally determined based on the measured distance and the targeting direction.

FIGS. 1*b,c,d* show schematically another exemplary laser scanner 100 as known in the art. Again, the surveying instrument 100 comprises a base 110 defining a vertical axis 111 and a structure 120, wherein the structure 120 is pivotable relative to the base 110 about the vertical axis 111.

As shown in the back view of FIG. 1*b*, a display 123 and an operating field or input field 124 for controlling the surveying instrument 100 are installed on the structure 120. Motorization for pivoting the structure 120 relative to the base 110 is provided in the structure 120 and the pivoting can therefore be brought about in a controlled manner. An adjustment rotary knob 125*a* for an adjustment mechanism renders it possible in this example to pivot the structure 120 also manually about the vertical axis 111.

Analogously, a beam deflector 130 which for instance comprises a mirror element for deflecting the laser measurement beam and also for example the field of view for image acquisition can be rotated about a tilt axis or horizontal axis 131. Motors for controlled motorized rotation of the beam deflection unit 130 are provided in the structure 120 in this case. Furthermore in the example, the beam deflection unit 130 can be aligned by manually by means of a second adjustment rotary knob 126, which interacts with a coarse drive, and very precisely by means of a further fine adjustment rotary knob 126*a* or control pushbutton, which is connected to a fine adjustment mechanism. The transmission ratio can also be designed to be adaptive by means of an electronic transducer, for example by increasing the rotational transmission as the speed of the rotational movement decreases. By means of the capability to align the beam deflection unit 130 provided thus, it is possible to align a measurement light beam on a target, both in a manual and controlled automatic manner (by means of the motors connected to the respective drives).

Moreover, the exemplary surveying instrument 100 comprises a handle 136, which can be removed from the laser scanner 100 in a modular manner. If the handle 136 is removed, it is possible to acquire an increased scanning region within the scope of e.g. a scanning process, wherein it is then additionally possible to acquire a region which was previously screened by the handle 136.

FIG. 1*c* shows the front view of a laser scanner 100. The measuring instrument 100 is in the example equipped with an additional overview camera 135 which comprises a comparatively large (compared to the measurement camera) horizontal angular range of e.g. 10-40° and therefore can be used for acquiring an overview image. Since the image region in such a configuration cannot be changed in the vertical direction, a lens of the overview camera 135 can furthermore be embodied in such a way that it can additionally image a large vertical angular range. As an alternative thereto, a plurality of camera modules with different vertical alignments could be arranged one above the other in place of the single overview camera 135.

The direction of the measurement beam is referred to as target line or measurement axis. For finding the target line more easily, the surveying instrument 100 can be equipped with an emitting guide light module 132 as depicted which visualizes the target line. Moreover, the laser scanner 100 comprises in the example a target search module 133 (power search), wherein this module 133 is securely placed on the structure 120 and therefore pivotable about the vertical axis 111. The module 133 consists of a transmission apparatus and a reception apparatus, which are arranged biaxially with respect to one another and span two vertical light fans placed next to one another. By way of example, the transmission apparatus is pulse modulated. It emits a signal, which can be reflected by a cooperative target, received by the reception apparatus and evaluated according to amplitude and travel time in real time. By way of example, this is how distance and degree of reflection of the target object are established. In the case of an alternative embodiment of the module 133, transmission and reception beams can be pivoted in any vertical direction via a back-side area of the beam deflection unit 130; as a result, it is also possible to find target objects at large elevation angles. Marked target points can also be found by means of an overview scan, in which the whole surroundings are scanned in a short time with a high measurement rate and the degrees of reflection of the found target markers can be established.

FIG. 1*d* shows in a cross-sectional view base 110, a structure 120 and the respective rotational axes, i.e. a vertical axis 111, about which the structure 120 can be pivoted, and a horizontal axis 131, about which the beam deflection unit 130 is rotatable. Furthermore, said surveying instrument is provided with a spindle 141 connected to the manually operable adjustment rotary knob 125*a*, by means of which spindle the structure 120 is pivoted relative to the base 110. Moreover, a first motor 142 interacts with the pivot device in such a way that pivoting can alternatively also be brought about in a controlled manner by means of the motor. Moreover, an angle sensor 143, for example an angle encoder with a micro-radian resolution, for measuring a relative position of the structure 120 relative to the base 110 is arranged on the pivot device. By means of a second angle sensor 145, it is additionally possible to determine and, in particular, continuously measure a relative position between the beam deflection unit 130 or a mechanical shaft 147 and the structure 120. Here, a second motor 146 is arranged on the mechanical shaft 147 in such a way that the beam deflection unit 130, which is connected to the mechanical shaft 147, can be rotated by means of the motor 146. Moreover in this example, provision is once again made for the coarse adjustment rotary knob 126 for coarse alignment, which renders a coarse drive controllable, and for a further fine adjustment rotary knob 126a, which is connected to a fine drive, for highly precisely aligning the beam deflection unit 130. The guide variable generated by the fine adjustment rotary knob 126a is, for example, processed by an electronic fine drive unit in order to adjust the second motor 146 in very fine angular steps, and thereby align the measurement beam on the target with sub-second of arc accuracy.

In the example, the structure 120 furthermore comprises an imaging system 150 with a rangefinder or distance measurement module 151 and a camera 152, wherein the beam source for pulse-modulated emission of the measurement radiation 155 is additionally assigned to the distance measurement module 151. The measurement radiation 155 is emitted by means of the imaging system 150 in the direction of the beam deflection unit 130 and deflected or reflected on the latter at a defined angle (rotational position of the fast axis 131) which together with the position of slow axis 111 defines the targeting direction as indicated by the depicted arrow. After the radiation was scattered or reflected at a target and radiated back to the surveying instrument 100, the radiation is once again routed by means of the beam deflection unit 130 via the imaging system 150 to the distance measurement module 151. By means of the distance measurement module 151, it is possible to determine a polar distance to an object point.

Moreover, a field of view 156 is aligned or varied by means of the beam deflection unit 130. Here, the field of view 156 is defined at least by the optical properties of the imaging system 150, i.e., for example, of the camera 152 and further optical components for guiding the radiation to be acquired by the camera 152, and by the optical properties of the beam deflection unit 130.

Using such an arrangement, the measurement direction defined by the measurement radiation 155 can be acquired using an image that can be acquired by the camera 152. Furthermore, the measurement radiation 155 can be e.g. aligned exactly on a target on the basis of this acquisition. Thus, an optical output can be continuously provided to a user, wherein both an image corresponding to the current field-of-view alignment and a marker displaying the measurement direction or the measurement axis are output. On the basis of this output, it is thus possible to align the measurement radiation 155, for example by bringing the displayed measurement direction and a desired target in the image into correspondence.

Moreover, an inclination sensor 144 is provided in the structure 120 in order to acquire the angle position of the laser scanner 100 with respect to the gravitational vector and optionally to enable a correction or compensation of the measurement values on the basis of the measured inclination.

Using such a surveying instrument 100, a horizontal and vertical angular range and a point resolution can be defined within the scope of a scanning process. During a continuous distance measurement using the distance measurement module 151 based thereon, the beam deflection unit 130, driven by the motor 146, rotates at a high speed about the horizontal axis 131 and the structure 120, driven by the motor 142, rotates at a lower speed about the vertical axis 111 such that the modulated laser beam 155 passes over the whole angular range to be surveyed. The respective alignment of the measurement beam 155 is acquired by the angle sensors 143,

145 in a manner concurrent with the distance measurement. By linking these values, it is then possible to calculate the coordinates of the measurement points acquired thus.

By means of a suitable synchronization of the angle sensors, two angles and at least one distance measurement can be combined simultaneously to form a polar 3D coordinate. A known trigger and synchronization concepts is based on the elevation angle sensor as a trigger source. An advantage of this method is that the angle distances between the measurement points are equal with high precision. In the case of asynchronous sensors, the adjacent measurement values are preferably interpolated in real time ("realtime"). Here, the distance can be measured simultaneously with in each case one angle measurement or carried out at a lower measurement rate. In the latter case, the distance assigned to an angle measurement is interpolated on the basis of the measured distances. A point cloud within the scope of a scanning functionality is thus acquired by rotating the beam deflection unit 130 and pivoting the structure 120 such that the measurement axis can be deflected in two directions, and hence a previously defined scanning region can be scanned. In the process, it is moreover possible to determine a point resolution, i.e., for example, the number of points to be acquired in the scanning region.

Furthermore, in some known instruments, a single-point scanning functionality can be carried out, wherein a single point is determined on the basis of the recorded scanning data. To this end, a measurement point is first of all targeted approximately. After triggering the single-point scanning functionality, the surveying instrument 100 starts a scanning process and generates a point cloud in predefined surroundings around the targeted direction or around the approximately targeted measurement point. After the recording, the point cloud is analyzed with respect to significant features (e.g. edges, corners) using appropriate algorithms and the coordinates of the measurement point are derived therefrom. Image data which were acquired with the measurement camera of the surveying instrument 1 can optionally also be used for determining the measurement point.

Figure 1E:
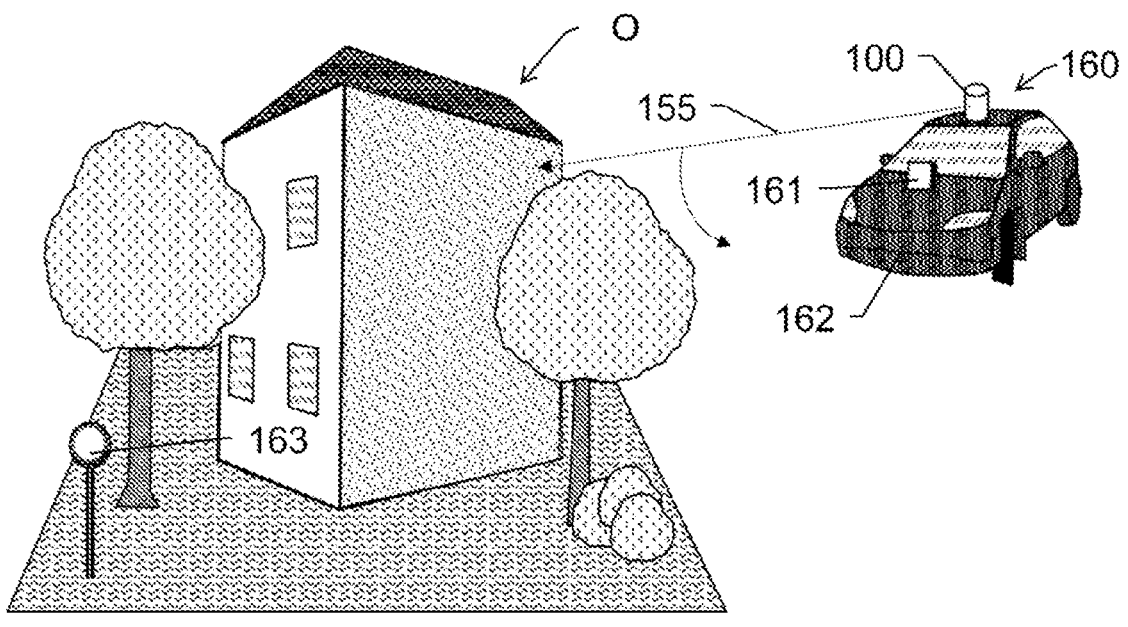

FIG. 1e shows an embodiment of a mobile measuring system 160 as known in the art used for mapping a scene of interest resp. objects O with a mobile mapping platform with a laser profiler 100 which swivels a measurement beam 155 over the objects' surfaces by rotation about one axis, or about two axes in case of a two-axes laser scanner. In the example, the scanner 100 is mounted onto a car 162 together with a RGB camera 161. The car 162 may be continuously moving while acquiring the environment. A car-based mobile mapping platform 160, for example, may typically be moving with velocities between 10-30 meters per second. Rail-based systems may be used for mapping as well. A mobile mapping system may also be carried by a human. Such hand-held mobile mapping systems may have lower speeds of locomotion and greater dynamics such as rotational speeds than car- or rail-based systems. The scanner 100 and the RGB camera 161 may have a known position and orientation to one another. The car-based mobile mapping platform 160 may drive through narrow streets in urban environments, mapping the environment it drives through. One metrological application might be to obtain to obtain a dense 3D reconstruction of an urban scene of interest with objects O. The dense 3D reconstruction should comprise both an actual 3D reconstruction, i.e. location information of imaged surfaces in a 3D coordinate system, but also color information associated to said images surfaces.

These days, laser scanners 100 are equipped with sensitive rangefinders, which are optimized for natural targets and, as a result thereof, can scan diffusely reflective surfaces of objects O with high measurement rates of up to several megapoints per second. Strong reflective targets such as reflector-assisted target markers or a street sign 163 can lead to an overload as a result of the high sensitivity thereof and the high degree of reflection. On the other hand, for weak incoming light e.g. originating from black targets, the SNR may be too low to precisely determine a distance or determine a distance at all.

Figure 2:
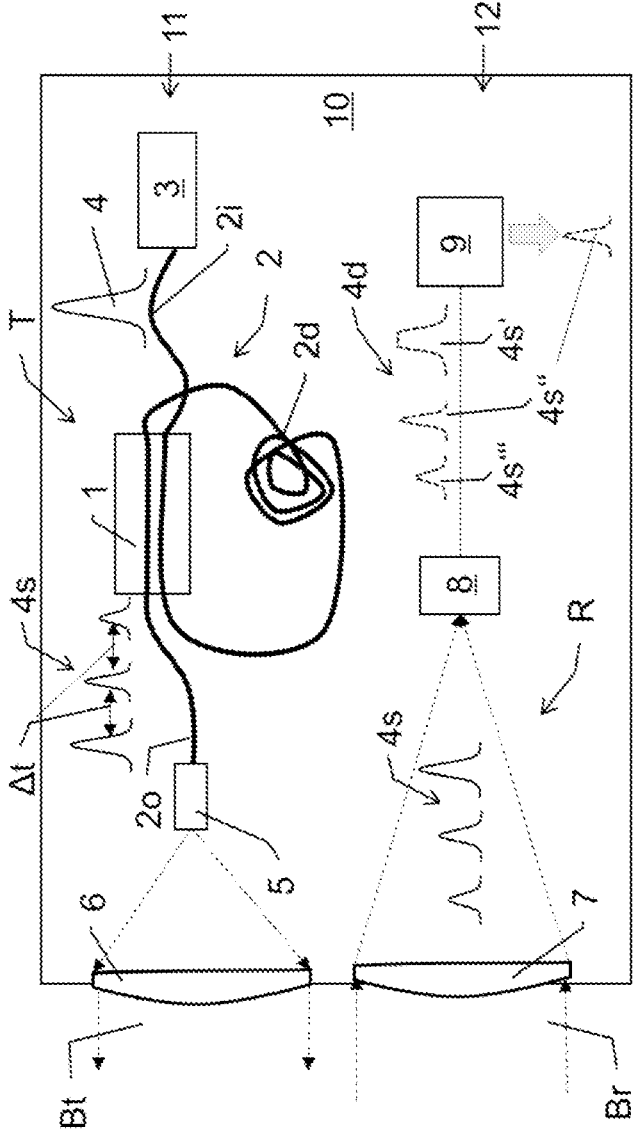
FIG. 2 schematically shows a first example of a laser scanner or laser profiler for generation of a sequence of sub-pulses using a fiber network, FIGS. 3a,b schematically show a further development of such a scanning measurement device.
Figure 2:
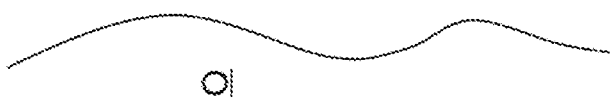

FIG. 2 shows a first example of a laser scanner or laser profiler 10 for scanning of a surface on an object O based on the principle of time of flight whereby for better clarity of the figure structures or features such as base, rotatable support structure or beam deflector, described above with respect to FIGS. 1a-d, are omitted. The device 10 is for example embodied as a scanning total station, a terrestrial laser scanner or laser profiler for geodesy or metrology or mobile mapping of the type as in principle described above. As said, such scanning instruments are used for generation of digital representations such as 3D-point clouds of natural or manmade object surfaces from measured point coordinates and/or e.g. used for dynamic mapping, 3D-modelling of construction sites, terrestrial and topographic land survey.

The inventive laser scanner or profiler comprises a transmission unit 11 (upper part of the depicted device 10) having light source 3, for example a laser, fiber laser, seeded fiber amplifier, comb laser, VCEL, superluminescent LED or LED. The light source 3 feeds a fiber network 2 of single-mode fibers as part of a transmission channel T. The fiber network 2 is connected to or said otherwise comprises a fiber based optical coupler 1 as an optical device that connects multiple fibers or fiber segments 2i, 2d (e.g. three or more fiber ends), dividing one input between two or more outputs, or combining two or more inputs into one output. An optical fiber coupler 1 allows the transmission of light waves through multiple paths. Such a fiber coupler 1 is e.g. embodied as a preferably passive 2×2 fused fiber optic coupler which can split light between two optical fibers with for example a coupling ratio 60%:40% or 10%:90%. Passive couplers use for example micro-lenses, graded-refractive-index (GRIN) rods and beam splitters, optical mixers, or splice and fuse the core of the optical fibers together. On the other hand, active fiber couplers which need power supply receive input signal(s) and use a combination of fiber optic detectors, optical-to-electrical converters, and light sources to transmit fiber optic signals. Therewith, a light pulse generated by source 3 and forwarded by input fiber 2i is pulled apart into a sequence of sub-pulses of different intensities or energies without loss of pulse energy in sum.

For example, the energy of an input pulse 4 from the laser 3 into the 2×2 fiber coupler 1 is split and 60% are output via output fiber 2o to a fiber-end adapter 5 and thereof via an transmission optics 6 as a free beam Bt to the object O to be scanned, whereas 40% of the light pulse are fed into a loop fiber or fiber delay line 2d of the fiber network 2. After a delay time Δt of for instance in the range of tenths or hundreds nanoseconds, e.g. 30 ns, the 40% of energy are entering again the 2×2 coupler 1 and 40% (=40%*40%=16% of the total initial energy) are directed to the output fiber 2o and the emitter optics, and the fraction of 60% (=40%*60%=24% of the total initial energy) are crossing over to the fiber loop 2d again. In the case of this example the ring-down structure generates a train of sub-pulses 4s with decreasing energies of 60%:40%*40%:40%* (60%)*40%:40%*(60%)$^2$*40%:40%*(60%)$^3$*40% and so on. For example the fifth sub-pulse is 17.4 times smaller than the first emitted sub-pulse. The coupler 1 can be embodied by two separate elements, too, e.g. an optical splitting element for pulse separation and a coupling element for coupling a sub-pulse 4s from the loop 2d into the output fiber 2o in such a two element implementation additional coupling losses are introduced.

In other words, the transmission unit 11 of measurement device 10 is designed to transform the input pulse 4 to generate a temporal series or sequence of sub-pulses 4s therefrom, whereby the sub-pulses 4s have different optical energy compared to each other, showing a ring-down behavior in energy. Depending on the transmission ratio, the energy may decrease monotonously or exponentially or vary in a non-gradual way, e.g. the second sub-pulse has the highest energy of all sub-pulses 4s (see also FIG. 3 below). The main characteristic is generation of a series of sub-pulses 4s of different energy, the series having at least a portion with sub-pulses 4s of falling energy in this example, and the sub-pulses 4s being equidistantly spaced in time by a time period Δt. Thus, a "time diverse" optical pulse transformation is provided which enhances the signal dynamic range.

The time interval Δt is for example at least twice the inverse of the electronic bandwidth of the optoelectronic receiver 8 resp. the receiving unit 12 and/or longer than the time length of the initial pulse 4. Also, a possible disturbance of the shape of a following or successive (weaker) sub-pulse by a saturating previous (stronger) sub-pulse can be avoided by setting of an adapted, e.g. sufficiently long, time spacing Δt.

The radiation at the exit fiber 2o, i.e. the sub-pulses 4s is directed to the transmitting optics 6 which projects the laser light sub-pulses 4s with smallest possible divergence of the beam Bt to the surface of the target O to be scanned. Light reflected from the target object O is received by a receiving unit 12 (lower half of the figure) whereby the returning beam Br of light sub-pulses 4s is fed into a receiving channel R via a receiving optics 7 and directed to a light sensor 8, e.g. an APD (Avalanche Photo Diode) or a MPPC (Multi Pixel Photon Counter), preferably with a bandwidth in the Giga-hertz range. Besides a photodetector, component 8 also can comprise electronic amplifiers, filters, electronic buffers and high-speed signal samplers. As known in the art (see FIGS. 1a-c) and different to the figure, selected mainly for clarity of depiction, the transmission unit 11 and receiving unit 12 can share optical elements, e.g. the transmitting optics 6 and receiving optics 7 can be one and the same lens or lenses or share a same beam exit/entry window.

An evaluation unit 9 of the receiving unit 12 is configured to select from the sequence of detected and digitally sampled sub-pulses 4d, comprising the three depicted sub-pulses 4s', 4s" and 4s‴ at least one sub-pulse, the energy of which yields an electric signal amplitude in the non-saturated range of the receiving unit 12 resp. light sensor including the opto-electronic signal chain 8 as a quality signature of a respective light sub-pulse 4s. This is schematically depicted in the figure as the second sub-pulse 4s" is selected (indicated by the grey arrow at evaluation unit 9). The first sub-pulse 4s' has a too high amplitude and saturates the receiver (indicated schematically in that the top of sampled pulse 4s' is cut off) and thus is not selected. The third sub-pulse 4s‴ has a lower energy than the second one and thus is less preferable with regard to signal-to-noise ratio. Hence, preferably the one of the sub-pulses 4s is selected with the most energy/optimal SNR whilst not saturating the receiver. The distance to a respective surface point of the object O to be scanned is then determined according to the time-of-flight of the selected sub-pulse 4s".

A series of sub-pulses $4s$ with decreasing or falling energy of subsequent sub-pulses thereby has the advantage that a sub-pulse with the highest acceptable energy (in this example sub-pulse $4s''$) is quickly available or in most cases sooner available compared to a sub-pulse series with increasing energy which starts with low-energy sub-pulses. Said otherwise, in a sequence of sub-pulses $4s$ with rising energies, often many (too) weak sub-pulses $4s$ must pass until a sufficiently strong or optimal sub-pulse finally arrives. With a sequence of sub-pulses $4s$ of decreasing energy, a strong reflective target in front of another target can hide this other target but a weak reflective target in front of a strong reflective target can be detected.

If more than one sub-pulse $4s$ is detected, they can be identified by their distance in time either to the selected optimal sub-pulse $4s''$ or to the strongest sub-pulse $4s'$. Thus, the scanning angle of the selected sub-pulse $4s''$ is known. If the time distance $\Delta t$ or the overall length of the sub-pulse sequence $4s$ is sufficiently short compared to the rate of change of the targeting direction of instrument $10$, the sub-pulse based measurement can be handled as a single shot measurement even without such a precise allocation of measurement angle to a respective selected sub-pulse $4s''$. For example, when the beam deflection rotates by 100 Hz and the temporal spacing between sub-pulses is 30 ns, then at a distance of 100 m the lateral spatial separation between two sub-pulses on the target surface is not more than 1.9 mm and thus smaller than the laser spot diameter on the target object. Single shot measurements have the advantage of a relatively high measurement rate. Alternatively to a single shot method, more than one sub-pulse is selected for distance determination, e.g. the two non-saturating sub-pulses $4s''$, $4s'''$ with best SNR and/or highest energy. As seen in the example above the spatial lateral resolution essentially remains at a high level.

Thereby, a fiber network $2$ for optical splitting consisting of single mode fibers has multiple advantages. First, the exit beam Bt is spatially diffraction limited, which leads to optimum spatial resolution of the projected laser spot at the target surface. Second, the dispersion across the diameter of the single mode fiber is in the range of maximum 100 femtoseconds, so the optical pulse $4s$ in air is flat over the cross section. Further, on the transmission side single mode fibers can be used without relevant loss of power efficiency (for comparison multi mode fiber components which can be used in the receiver unit are more complex than single mode fiber components and show mode selective time delay). Finally, typical single mode fibers have smaller bending radii than multimode fibers, so the geometrical dimensions of the transmission channel T can be kept relatively small, especially for the few meters long fiber for time delay.

A measuring instrument as shown may show some sort of dead time. During the time of the impinging sub-pulses $4s$ on the receiving photodiode $8$ (APD or MPPC), the scanning instrument cannot easily handle multiple target echoes within a long time-interval of sub-pulses $4s$. So closely spaced double targets O cannot be measured accurately, especially when the sub-pulses $4s$ of different echoes overlap. Following FIG. 3 shows an exemplary embodiment which enables to reduce or solve this problem.

Figures 3A, 3B:
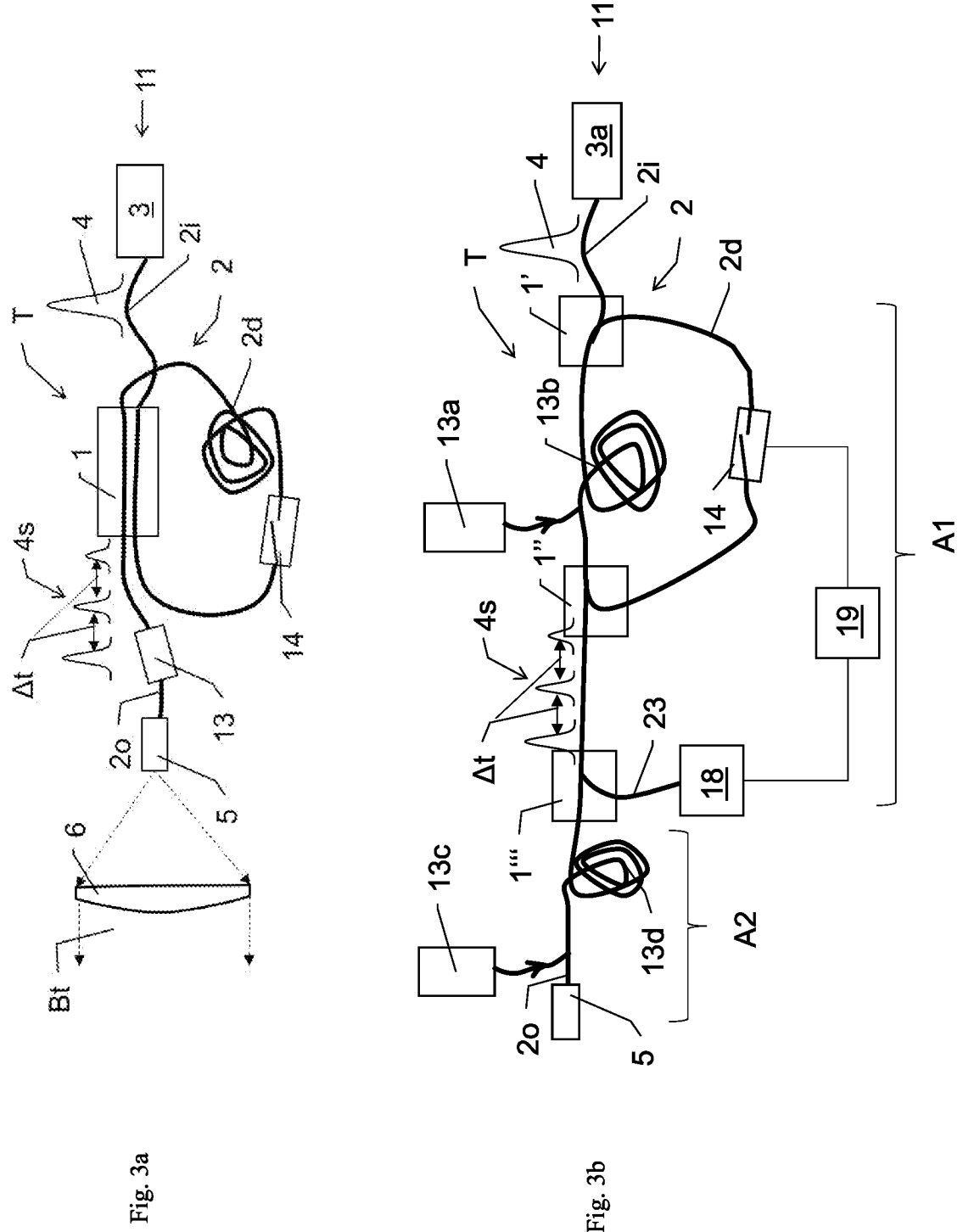

FIG. 3a shows a further development of a measurement instrument. For simplicity, in contrast to FIGS. 1 and 2, only the transmitting unit 11 with the transmitter channel T is depicted. In this embodiment, the loop fiber $2d$ can be interrupted by a (fiber) switch 14. The switch can e.g. be a fiber optical telecom component or an opto-electronic optical device designed for free light beams.

The switch 14 allows to interrupt the serial pulse splitting achieved by the loop-structure of the fiber network $2$. Hence, the original pulse $4$ can be pulled apart in a distinct number N of sub-pulses. This embodiment allows to stop the emitting burst sequence exactly after the emission of N sub-pulses. The finite length of the emitted sequence has the advantage to have a reasonable long pause until the next sequence of sub-pulses $4s$ will be emitted. As an example, when measuring the scene with a point rate of 1M points per second and the burst sequences comprise 4 sub-pulses with a mutual time spacing $\Delta t$ of 30 ns, then the length of the sequences is 3*30 ns=90 ns and the pause between the burst sequences 910 ns. At least 90% of the measurement time is not corrupted by returning pulses. Optionally, e.g. for short object distances of a few meters, the sequence can have a length with a variable number of sub-pulses. The burst sequence can be adaptively interrupted as soon a sub-pulse $4a$ with an optimum, e.g. not saturated signal strength is detected by the receiver. Then the switch 14 at the emitter is opened within a few nanoseconds. The circulation of puslets in the ring-down structure is thus stopped. Hence, it is avoided that some more sub-pulses $4s$ originating of the same initial pulse arrive from the same target after the selected sub-pulse $4s$ which would introduce a kind of dead time for detection.

The number N can optionally be set dependent on parameters, too, such as initial pulse energy, measurement rate, target distance or energy or SNR of the received pulses. The setting can be made by a user in advance of a scanning or can be made automatically, as further explained in context of following FIG. 3b. Thereby as an option, the setting can be dynamic as an adaption to a change of parameter during scanning.

In addition, such a switch 14 allows to set the measuring instrument to behave as a standard laser scanner having a standard signal dynamic range: if the optical switch 14 is permanently «off» in this scanning setting, then there is no pulse splitting and a single pulse is emitted to the target object. In this case also closely spaced targets outside the longitudinal «range resolution» (length of the receiver impulse response) can be easily and precisely measured.

As an alternative to a transmission unit with splitting stop e.g. by a switch or as an addition thereto, problems arising from a two-target situation, whereby two reflected series of sub-pulses $4s$ may overlap, can be resolved by a subtraction of the neighbours of the selected optimum pulse which can be executed in knowledge of the time intervals of the sub-pulses $4s$. In this case the waveform looks like a waveform generated by a single pulse emitter. The subtraction can be done for all multiple target echoes. Therefore, an algorithmic cleaning of the received signal-waveform from the sub-pulses $4s$ around the optimum sub-pulse which is used for distance estimation can be applied to measure accurately distance to closely spaced targets.

The instrument comprises an optical amplifier 13 at the output for amplifying outgoing sub-pulses $4s$, too. The amplifier 13 is for instance embodied as a doped fiber amplifier, e.g. an EDFA (Erbium Doped Fiber Amplifier) for wavelengths in the C-band (1530-1565 nm), YDFA (Ytterbium Doped Fiber Amplifier) for wavelengths range (1025-1075 nm) or any other kind of rare-earth doped fiber amplifiers. Also bismuth-doped fiber amplifiers in the spectral range from 1300 to 1450 nm or from 1630 to 1730 nm are of interest. In the case of optical fiber amplifiers such as EDFA or YDFA, typical amplification factors are between 50 and $10^5$. Compact devices of medium to high power offer the functionality of varying the amplification over a range of approximately a factor of 100. One advantage is obtaining high beam quality, in particular, the radiation is practically spatially diffraction-limited in the case of amplifiers having monomodal fibers. Such an amplifier can be placed at the input and/or output port of the fiber loop.

In case of an EDFA or YDFA as an optical amplifier 13, the fiber coupler 1, the fiber delay line 2d and/or the switch 14 can be integrated in the amplifier 13. For instance in case of a multistage amplifier, the single mode doped amplifier fiber of the first gain stage can be used as delay line. So, costs and size can be reduced by sharing parts of the amplifier and the fiber network.

FIG. 3b shows a further development of a measurement instrument with a switch 14. Like FIG. 3a, again for simplicity only the transmitting unit 11 with the transmitter channel T is depicted. In this embodiment, too, the loop fiber 2d, provided by a first fiber coupler (splitter) 1' and second fiber coupler (combiner) 1", which transform input pulse 4 into sub-pulse sequence 4s by recursive pulse splitting, can be interrupted by a (fiber) switch 14. Above that, the transmitter 11 comprises to laser gain stages A1, A2 for amplifying the signal of a seed laser 3a.

Each amplifier stage A1, A2 comprises a pump laser 13a, 13c and an active optical fiber 13b, 13c. The gain of the first amplifier stage A1 determines, if the sequence of sub-pulses 4s shows a decrease or increase of pulse energy of subsequent sub-pulses. If the first amplifier stage A1 resp. the fiber loop 2d has a negative loop gain, the sub-pulse sequence is of falling energy as schematically indicated in the figure, if the first stage A1 has a positive loop gain, a sequence of rising energy can be putted out at output fiber 2o resp. by emitter 5. Thereby preferably, the gain of the first stage A1 is greater than 1. For example, with a gain of 1000 and a split ratio at second coupler 1" of 1/100 and of 1/100 at first coupler 1', the first light pulse of a sub-pulse series 4s is about 1000 times stronger than the seed pulse 4, the following sub-pulses of the series 4s decreasing in energy by 1/10 per loop compared to the first sub-pulse.

Hence, the shown configuration with additional amplifier stages A1, A2 provides the ability of a flexible or variable setting of the energy of sub-pulses or the difference of energy between them, the energy either decreasing or increasing between successive sub-pulses. It is even possible to generate sequences with sequence portions of decreasing energy and a portion of one sub-pulse sequence of rising energy or one sub-pulse series with increasing energy and another/following series with decreasing energy.

The depicted embodiment further has means for control of switch 14 dependent on the generated sub-pulses 4s. The sub-pulses 4s, outputted by the loop 2d, are led to the further optical splitter 1''' and a "probing" fraction or portion is split off. This fraction is directed via a fiber 23 to a trigger or monitoring diode 18. Regarding the branched off pulse fractions 4f, the strength of each pulse fraction 4f, which is indicative of the strength of its respective sub- or signal-pulse 4s, is measured by said trigger or monitoring diode 18. The trigger/monitoring diode 18 controls switch 14 via an electronic controller/comparator 19.

Figures 4, 5A, 6:
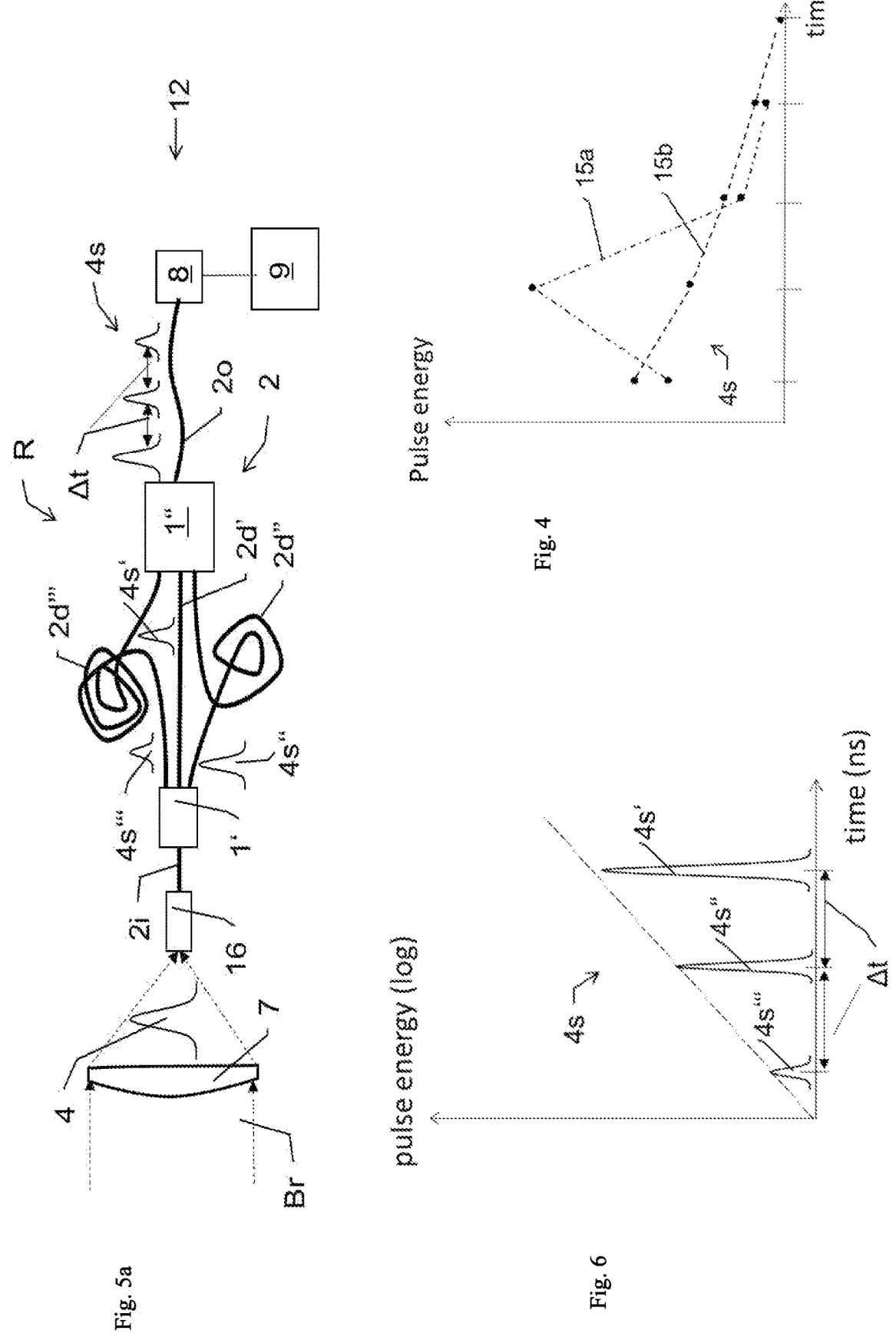
FIG. 4 shows schematically two examples for energy distribution of sub-pulses, FIGS. 5a,b schematically show another exemplary embodiments of a scanning measuring instrument with temporal optical pulse transformation by a fiber network.
FIG. 6 shows schematically an example of a sub-pulse series outputted by a transmitting unit of a measuring instrument according to FIG. 5a, FIG. 7 shows an exemplary schematic embodiment of a measuring device with a fiber network on the receiving side, FIG. 8 schematically shows a further development of a receiving channel or unit, FIG. 9 schematically shows another embodiment of a scanning measuring instrument with pulse transformation in the receiver.

FIG. 4 shows schematically two examples 15a (dashed-dotted line) and 15b (dashed line) for energy distribution of sub-pulses 4s which can be implemented for instance by an embodiment as shown in FIG. 3 above. Dependent on the coupling ratio of the 2×2 fiber coupler 1, the energy of the sub-pulses 4s varies differently. In the first exemplary energy distribution 15a, the first sub-pulse has a lower energy than the second one but a higher energy than the third and fourth (and in this example last) sub-pulse, whereby the energy is for example exponentially decreasing from the second sub-pulse on. In the second example 15b with five sub-pulses 4s, the energy is continuously decreasing.

In both examples 15a, 15b, the number of sub-pulses 4s is limited. That is, the initial pulse is split into a defined number of sub-pulses 4s, in the example 15a the number N=4 and in the second example 15b N=5. The pulse splitting is e.g. stopped by a switch in the fiber loop as shown in FIG. 3, which allows to stop the train of sub-pulses 4s by shortly open the optical switch, at least before a next sub-pulse sequence is emitted. Thereby, the whole duration of a sub-pulse sequence is for example shorter than 500 ns or 100 ns and can for example depend on the required signal dynamics, the measurement point rate, and/or the speed with which the targeting axis is swiveled. If the sub-pulse generation is not actively stopped, it is theoretically of infinite length whilst in practice only a certain number of sub-pulses are usable or of relevance as e.g. not hidden in noise. The duration of the sub-pulse sequence then means the duration of these relevant, non-neglectable sub-pulses 4s, e.g. having an energy above a certain detection threshold and covering the required signal amplitude range. Hence for example, the amplitude or energy range of these sub-pulses 4s covers the extension of the signal dynamic range of the laser scanner of at least a factor of 50, 300, 512 or even 1000. In any case these sub-pulses 4s have to be shorter than the time interval between two adjacent surface points to be measured.

FIG. 5a shows another exemplary embodiment of a scanning measuring instrument with temporal optical pulse transformation by a fiber network 2, whereby again like in FIG. 3, only the transmitting unit 11 is depicted. In this example, the initial light pulse 4, generated by light source 3 is transferred via input fiber 2 to an 1×3 optical fiber coupler embodied as a single mode splitter 1'. The splitter 1' feeds a fiber network with—in this example—three different delay single mode fibers 2d', 2d", 2d''' of different length, e.g. some tenth centimeter, four meters and eight meters. For achieving a higher quality of pulse separation at the receiver side, a longer spacing of the sub-pulses 4s', 4s", 4s''' of 30 ns is preferred, so the fiber lengths differ even more. At the exit side, all these optical channels are combined to a single fiber 2o guiding the light to the emitting optics 6 forming the scanner beam Bt.

The delay fibers 2d', 2d", 2d''' have different lengths such that the sub-pulses 4s', 4s", 4s''' are temporally separated by a time interval longer than the pulse length, preferably longer than the response time of the electronic receiver unit. Before the transmitting optics 6, the optical paths are combined to a common optical path for emitting all sub-pulses 4s along the same measurement axis via single fiber 2o by an 3×1 optical coupler 1" The end of output fiber 2o is located in the focal plane of the emitting optics 6 such that the free space laser beam Bt is collimated versus the target surface. Since the difference of the lengths of the fibers 2d', 2d", 2d''', e.g. a difference of 4 m for a time separation Δt of 20 ns (10 ns*3E8/1.5=4 m), can be determined by factory calibration no additional special ToF or time delay calibration is needed.

For providing sub-pulses 4s', 4s", 4s''' of different, in particular decreasing energy, i.e. the first sub-pulse being the strongest, the last one the weakest, the beam splitter 1' and beam combiner 1" have different radiometric ratios. The combined splitting ratios of the fiber network 2 resp. of beam couplers 1', 1" is for example 1:8:64. In the non-depicted case of a splitting into five sub-pulses the combined energy ratio can be 1:8:64:512:4069. A resulting exemplary energy distribution of sub-pulses 4s', 4s", 4s"' is depicted in following FIG. 6.

Figures 5B, 7:
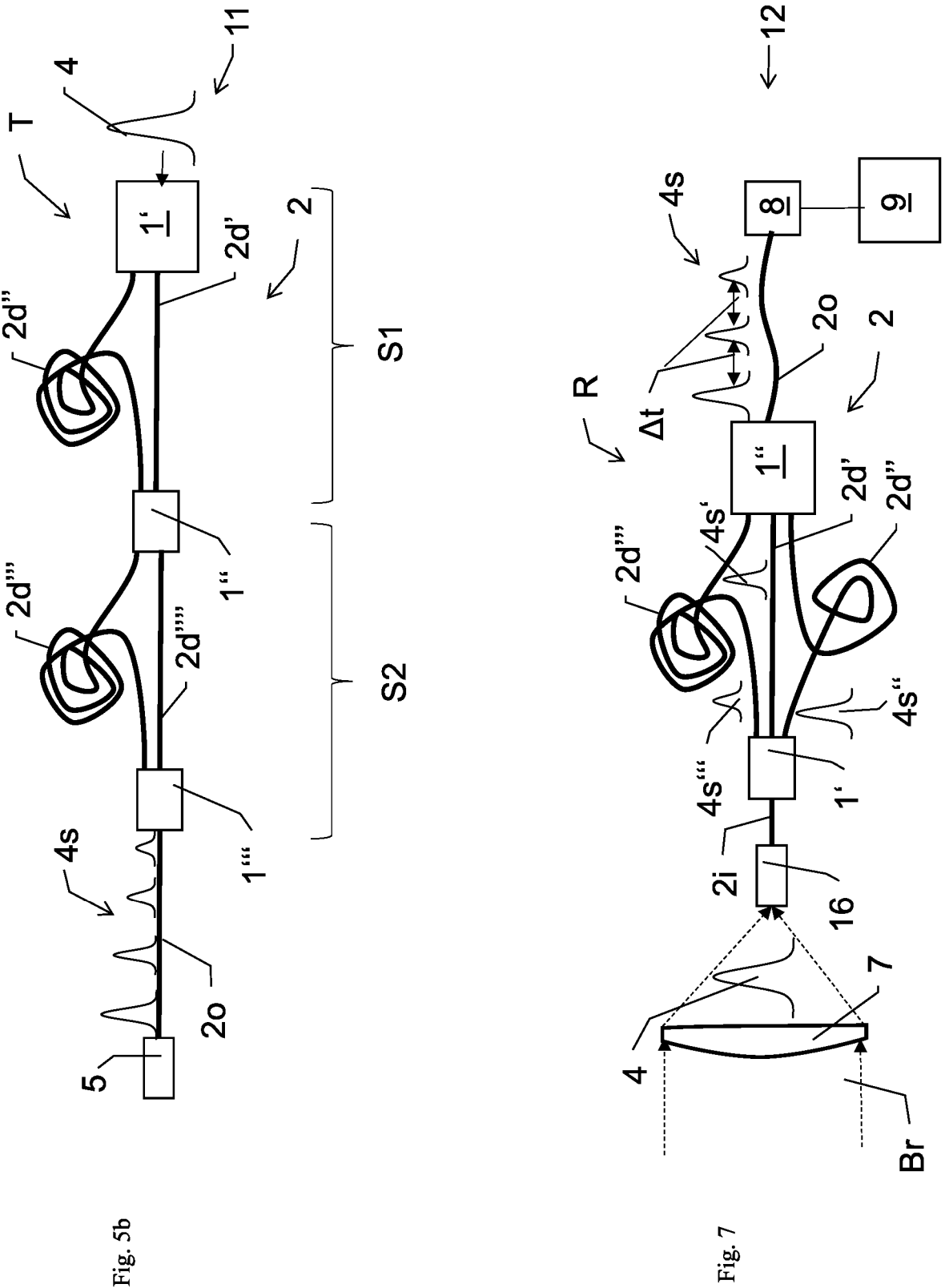

FIG. 5b shows another exemplary embodiment of a scanning measuring instrument with temporal optical pulse transformation by a transmitter-side fiber network 2. Again for simplicity in illustration, only part of the transmitting unit 11 resp. transmission channel T is depicted. Like in case of the embodiment of FIG. 5a, the scanner comprises different delay fibers 2d', 2d", 2d"', 2d"", however in this case, the fiber delay is divided into two stages S1, S2. By a first fiber splitter 1', the original pulse 4 is split, in the example into two sub-pulses, these two sub-pulses traveling along the fibers 2d' and 2d" of different length/delay. By a further fiber coupler 1", the sub-pulses exiting the first stage S1 are split again and fed into third and fourth delay lines 2d"' and 2d"". The second delay stage S2 ends in fiber combiner 1"' which combines the different beam paths to output fiber 2o which transmits the sequence of four sub-pulses 4s to emitter 5.

The (four) sub-pulses 4s have different delays. For example, if the delay of the short fibers 2d' and 2d"" both is 1ns and the delay of second fiber 2d" of the first stage S1 is 20 ns and the delay of third fiber 2d"' of the second stage S2 is 40 ns, the resulting overall or combined delay of the first sub-pulse is 2 ns (1 ns+1 ns), of the second 21 ns (1 ns+20 ns), of the third 41 ns (1 ns+40 ns) and f the fourth and last sub-pulse 60 ns (20 ns+40 ns).

Examples for the sub-pulse energy ratios are, e.g. with splitter 1' having a ratio of 80:20%, coupler 1" of 70:30% and combiner 1"' of 90:10%:1.4% of the input pulse energy for the first sub-pulse, 2.4% for the second sub-pulse, 5.4% for the third one and 50.4% for the fourth sub-pulse. A more extended signal dynamic range can be provided by other optical coupler ratios, e.g. coupler ratios of 70:30%, 97:3% and 80:20% for fiber couplers 1', 1", 1"' yields to sub-pulse energy ratios of 1:9.3:75:129.

FIG. 6 shows schematically an example of a sub-pulse series 4s outputted by a transmitting unit of a measuring instrument as for instance depicted in FIG. 5 with a possible distribution of optical peak power, whereby the pulse energy scale (in arbitrary units) is a logarithmic one. The ratio between neighboring pulses, 4s"' and 4s", 4s" and 4s"", is 1:8. The first pulse 4s"' is weakest, the last pulse 4s' is strongest.

Particularly for single echoes and largely spaced multiple targets an emitted pulse sequence as shown with increasing intensity is advantageous compared to a sub-pulse sequence with falling intensity as in the latter case possible receiver saturation by a (too) strong sub-pulse can disturb the detection of the following sub-pulse. That is, if the first sub-pulse 4s"' is the weakest and the latest sub-pulse 4s' the strongest, the optimum sub-pulse at receiver side always occurs before the sub-pulse which could generate saturation of the receiver electronics. Often receiver saturation generates a dead time because of the time needed to recharge the electronical capacitors.

FIG. 7 shows an exemplary schematic embodiment of a measuring device with a fiber network 2 on the receiving side. For sake of simplicity, only the receiving unit 12 is depicted. The figure depicts that a received pulse 4 is coupled into an optical fiber 2i over a fiber-end adapting element 16 and then is pulled apart into three pulses 4s', 4s", 4s"' of different optical intensities e.g. by a multimode fiber splitter 1' with energy ratios of 1:8:64:512. All fibers 2i, 2o, 2d', 2d", 2d"' are preferably multimode step-index or graded-index optical fibers such that a large number M of speckles of the returning light pulses are collected. By this design, the intensity variation is reduce by the square root M when scanning over diffusively scattering object surfaces.

Three delay fibers 2d', 2d", 2d"' with different lengths enable that the split pulses 4s', 4s", 4s"' are temporally separated by a time interval longer than their pulse length. The three fibers 2d', 2d", 2d"' are combined by a fiber coupler 1", so the sub-pulses 4s', 4s", 4s"' are guided via one fiber 2o to a common opto-electronic detector 8, e.g. an APD or MPPC, electrically coupled to an evaluation unit 9. Though this solution is on the receiver side, it provides likewise an emitter side-solution the advantage that one detector 8 is sufficient. One detector 8 instead of multiple detectors for each receiving (sub-)channel has the advantage that no parallelization of detectors, analog and digital high-speed electronics and evaluation electronics is needed and in particular no thermally induced distance drifts between different sensors and electronic channels can occur. Then, no special ToF or time delay calibration in this regard is needed.

Hence, serial pulse splitting in a multi-parallel architecture of optical channels is here realized by a fiber network 2 of the receiver channel R. Typically three to four multi-mode optical fibers 2d', 2d", 2d"' with their individual lengths represent an individual (part of the) optical channel of different length. At the exit side, all these optical channels are finally combined to a single fiber 2o guiding the light to an APD or MPPC 8.

When a reflected optical laser pulse 4 of the reflected beam Br is collected by the receiving lens 7, the light pulse 4 is divided into a number of sub-pulses. The splitting ratio of for instance four different channels are for example 1:7:49:343. And the time delays through these channels differ by a time interval $\Delta t$ which is at least twice the inverse of the electronic bandwidth of the receiver 8, for example by 25 ns. So, the fiber lengths differ e.g. by 25 ns*3E8/1.5=5 m, hence examples of fiber lengths are: 10 cm, 5.1 m, 10.1 m and 15.1 m.

Preferably the multimode fibers 2i, 2d', 2d", 2d"', 2o are so called graded-index fibers chosen specifically for the used laser wavelength to prevent time delay variation among mode distribution and pulse broadening at least for the used laser wavelength. Since such multimode fibers have larger overall diameters than single mode fibers, e.g. of 230 μm, the bending radius of the latter is much larger than that of singlemode fibers. Hence, when wrapping multimode fibers into a fiber box, they take much more place than single mode fibers which makes the laser scanner bigger. Therefrom short fibers 2d', 2d", 2d"' (and therewith short time separation $\Delta t$) are preferable, also in view of mode dispersion.

As an option, an optical pulse transformation can be implemented both in the transmitting and the receiving channel, e.g. further pulling apart received sub-pulses 4s provided by the transmitter in the receiver. For instance in the receiver unit, the initial pulse is split into two sub-pulses and each received sub-pulse is split into two or three by the transmitter unit to further enable handling an even greater dynamic range by the measuring instrument.

Figure 8:
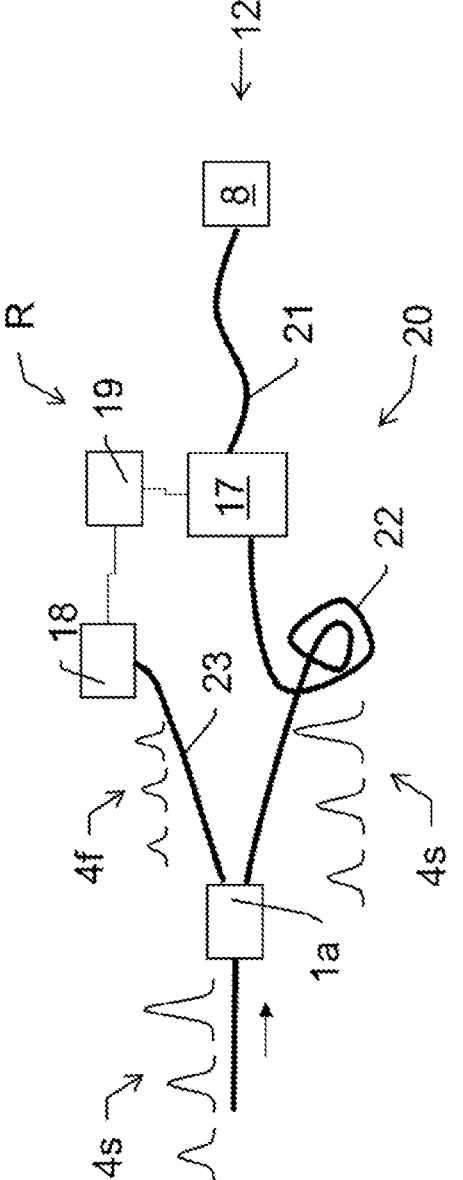

FIG. 8 shows a further development of the receiving channel R resp. the receiving unit 12 (only partly depicted in the figure) with an active component for setting an optical pulse attenuation. The receiver channel R has a second fiber network 20 with a fiber coupler 1a for splitting off a fraction 4f of the received signal 4s.

The received sub-pulses 4s, either generated in the transmission channel (cf. e.g. FIG. 1, 2 or 4) or in the receiving channel R (cf. e.g. FIG. 6) are led to the optical splitter 1a and a small fraction or portion 4f is split off, e.g. 5% of the respective pulse energy (cf. also FIG. 3*b* above). This fraction 4*f* is directed via a fiber 23 to a trigger or monitoring diode 18. The sub-pulses 4*s* as such are transferred via a delay fiber 22 (a fiber 22 longer than the trigger line 23) to the optical distance sensor 17. This delayed optical signal line 22 together with fiber 21 and the single photodetector 8 represent (the last part of) the optical ToF path of the scanner. Both photodetectors 18 and 8 are preferably APDs, MPPCs or any other types of high-speed photodetectors with intrinsic amplification.

Regarding the branched off pulse fractions 4*f*, the strength of each pulse fraction 4*f*, which is indicative of the strength of its respective sub- or signal-pulse 4*s*, is measured by said trigger or monitoring diode 18 and its circuitry in order to identify "large" signals which would saturate the APD 8 or the receiving electronics.

The trigger/monitoring diode 18 controls a variable optical attenuator (VOA) 17, for example as shown via an electronic controller/comparator 19. Therewith, by the trigger/monitoring diode 18, the variable optical attenuator 17 is controlled for adjusting a respective sub-pulse 4*s* according to the measured signal strength to achieve an output signal of the delayed light 4*s* in an optimum range for the APD 8. For example, a controller 19 controls the VOA 17 in analogue levels or a comparator with an upper threshold to prevent saturation (which comparator may also take a lower threshold into account for blocking weak pulse with (too) low SNR).

Hence, the energy of a respective sub-pulse 4*s* is measured, at least in that it is compared to a maximum signal threshold and in case of a too strong (sub-)pulse 4*s*, the VOA 17 is activated by means of the trigger diode 18, preventing overdriving of the receiver unit 12.

As an alternative or addition to a VOA 17, a switch could be triggered alike, i.e. the measuring path would be cut by opening the switch in case of a pulse which is too strong, e.g. out of the linear range of the sensor 8 or saturating the receiver chain 12. A Transimpedance Amplifier (TIA) can be an alternative to a trigger diode 18, in particular in embodiments using a sequence of sub-pulses 4*s* with increasing energy. An optical element such as fiber-optical switch allows then a controlled interruption or stop of the sub-pulse series 4*s* in the receiver channel R. Switching occurs for instance after detecting an optimal set of sub-pulses 4*s*. In the best case, the switching element 17 is controlled in such a way that it lets pass only the one optimal sub-pulse 4*s*, thus selecting therewith the sub-pulse 4*s* with best SNR.

Today highly integrated high-speed VOA 17 are commercially available with switching times as short as 10 ns or 5 ns. An essential point is that attenuation is done by an optical element, in this case by an active attenuator 17 because no time delay or phase shift is introduced by changing the pulse intensity, therewith avoiding influencing the response time and thus the measured time of flight as would be the case in electrical signal attenuation by varying the gain of an APD 8. The present further developed system also works well for closely spaced double or multiple targets even when they differ strongly by reflectivity.

Figure 9:
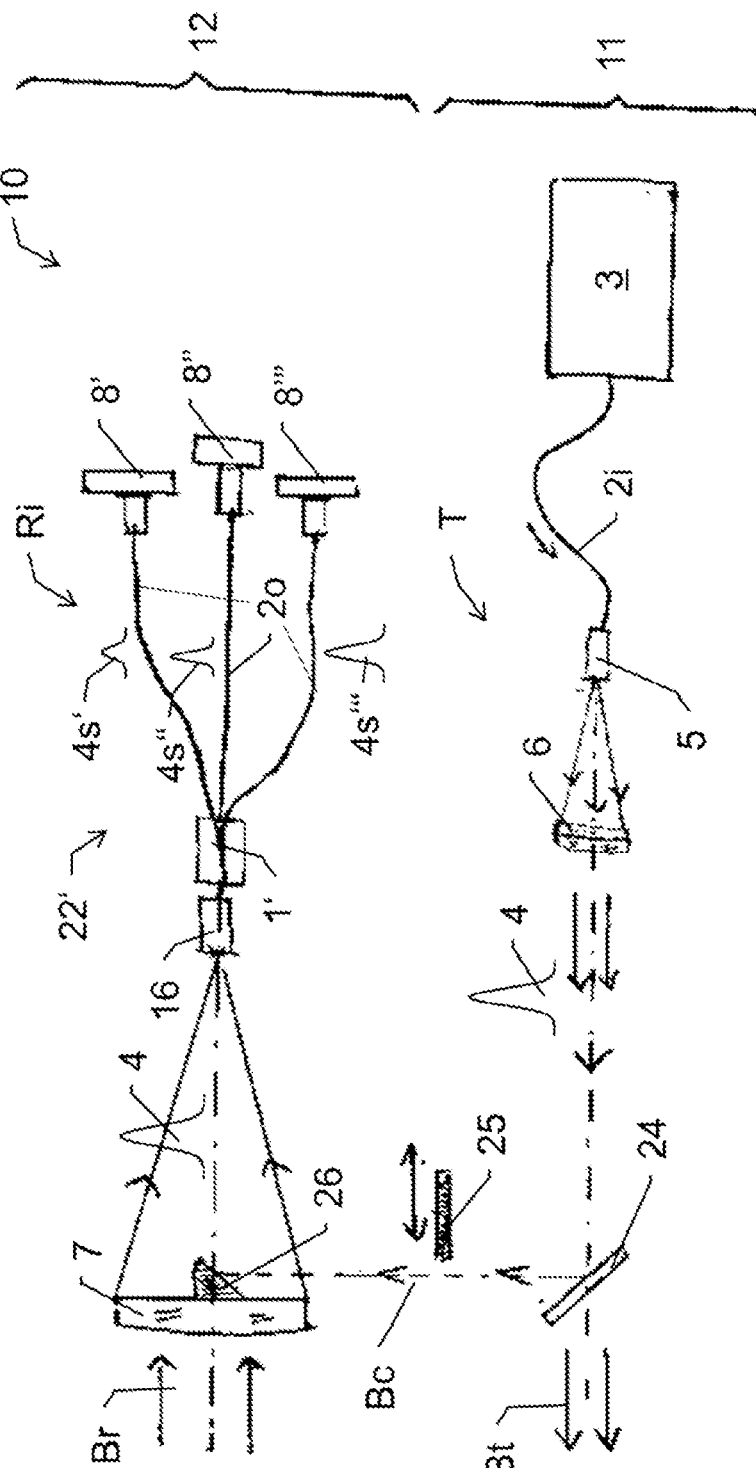

FIG. 9 shows another embodiment of a scanning measuring instrument 10 with a transmitter unit 11 having a single emitter chain with a light source 3, transmitting fiber 2*i*, emitter 5 and emitter optics 6 (lower part of the figure) and a receiver unit 12 (upper part). In this example, there is a receiver-side optical power splitting into several optical channels with individual photodetectors 8', 8'', 8'''. Such a (parallel) pulse splitting by pulse dividing over a beam splitter 1' and using more than one photodetector is another way to solve the signal dynamic problem. One of the advantages is that also closely spaced targets ca be measured because there are no time separated but spatially separated optical pulses impinging on separated, assigned APDs 8', 8'', 8''' having different receiving ranges or linear working ranges.

Here optical fiber based pulse transformation is performed by using a multi-parallel fiber network architecture of optical (in the example three) receiver channels Ri having at least nearly the same optical lengths. The received pulse 4 of reflected beam Br, coupled into the fiber network 22' by coupling element 16, is divided into different sub-pulses 4*s*', 4*s*'', 4*s*''' whereby each sub-pulse is guided into a different fiber 2*o* by beam coupler resp. beam splitter 1'. The fibers 2*o* have all lengths of 10 cm to 40 cm each for example. At each fiber end the radiation is directed to an assigned APD 8', 8'', 8'''. The splitting ratio of the optical power of the sub-pulses is for example 1:8:64. Weak sub-pulse 4*s*' is received e.g. by the first APD 8', mid-level signals 4*s*'' by the second APD 8'' and strong pulses 4*s*''' by third APD 8'''. Because of the shortness of all three fibers 2*o*, step-index multimode fibers are a good choice.

When using more than one APD at receiver side 12 of the measuring instrument 10, then a calibration method is needed to determine the time of flight offsets of each individual APD-channel Ri. Such a calibration is required from time to time also in the field as an absolute distance accuracy of a few millimeters or better is only achievable by such so called field calibrations.

A way to measure the individual distance offsets assigned to each of the three optical channels Ri including the time delay or response delay of the individual APD or MPPC 8', 8'', 8''' and the transit time of the electronics and therewith calibrate all the parallel channels with respect to a ToF-distance measurement is as follows:

At the emitter 11, a fraction Bc of the transmitting light beam Bt is guided versus the receiving channel 12 by a semi-transparent mirror 24 and from there by a mirror 26 preferably close to the receiving optics 7 into the fiber network 22' likewise a received beam Br. An internal light shutter 25 is able to open this internal light path which guides laser light internally to all three detectors 8', 8'', 8'''. The according three internal detector signals are evaluated and yield three internal distance offsets based on the well known and stable lengths of the internal light or reference paths. These three measured distance offsets are used to calibrate the time of flight of the laser scanner 10 to handle drifts and thermal effects.

If a variable attenuator is placed at the shutter segment 25 of the internal light path, calibration beams Bc of all signal strengths of interest can be directed to the photodiodes 8', 8'', 8'''. This allows to measure the individual distance offsets with an optimum SNR at each detector 8', 8'', 8'''. Alternatively, especially for laser scanners 10 with a rotating mirror, an external NADIR target can be placed at a well defined distance, for example at a base of or connected to the instrument 10, e.g. a special target at the end of a tripod or base plate, which periodically reflects a small fraction of the emitted laser light to all detectors 8', 8'', 8'''. So also in this case thermal drifts and other effects influencing the time-of-flight can be measured and calibrated on the measurement data. The NADIR target can comprise three different reflectivities with the ratio 1:8:64 to compensate the ratios of the fiber beam splitter 1'.

A skilled person is aware of the fact that details, which are here shown and explained with respect to different embodiments, can also be combined in other permutations if not indicated otherwise.

The invention claimed is:

1. A laser scanner or laser profiler for measuring of object surfaces, the laser scanner or laser profiler comprising:
a control and processing unit,
a light pulse source for generation of light pulses as measurement light,
a support structure,
a transmission unit for emitting a respective light pulse into free space towards the object surfaces with a beam deflection unit for varying an alignment of an emission direction of the measurement light, wherein the beam deflection unit is rotatable about at least one axis relative to the support structure,
at least one position meter for measuring the alignment of the at least one axis,
a receiving unit for receiving measurement light reflected from the object surfaces, and
a scanning functionality, wherein, when the scanning functionality is carried out in an automatically controlled manner by the control and processing unit, there is scanning with:
rotating the beam deflection unit about the at least one axis,
measuring the respective distance to surface points based on the received measurement light according to the principle of time-of-flight, and measuring the respective alignment of the at least one axis, and
generating a point cloud based on the measured distances and alignments, wherein:
the laser scanner or laser profiler includes a fiber network with a fiber based optical coupler,
the fiber network includes at least one fiber delay line,
the fiber network is integrated in an EDFA or YDFA doped-fiber amplifier, providing at least part of the fiber delay line,
the fiber network is designed for transforming a respective light pulse into a series of separated sub-pulses of different energies, whereby the control and processing unit is configured:
to digitally sample the sub-pulses,
to select at least one of the sub-pulses having an energy yielding an electrical signal amplitude in the non-saturated range of the receiving unit, and
to determine said respective distance based on deducing a time-of-flight of the at least one selected sub-pulse.

2. The laser scanner or laser profiler according to claim 1, wherein the first fiber based optical coupler and the fiber delay line form a loop for recursive splitting of the light pulse.

3. The laser scanner or laser profiler according to claim 1, wherein the fiber delay line comprises a fiber switch for temporary interruption of the fiber delay line.

4. The laser scanner or laser profiler according to claim 3, wherein the fiber switch is triggerable in response to a received sub-pulse.

5. The laser scanner or laser profiler according to claim 1, wherein the doped-fiber amplifier is a multi-stage amplifier and the fiber delay line is provided by a single mode fiber of its first amplifier stage.

6. The laser scanner or laser profiler according to claim 1, wherein the transmission unit comprises the first fiber based optical coupler and the first fiber network.

7. The laser scanner or laser profiler according to claim 1, wherein the receiving unit comprises
a second fiber based optical coupler and a second fiber network for splitting off a fraction of the energy of a respective received sub-pulse and
a variable optical attenuator or a switch in the receiving unit controllable in response to the pulse fraction.

8. The laser scanner or laser profiler according to claim 1, wherein the time interval between two subsequent sub-pulses is
equal for all sub-pulses of the series and/or
longer than the time length of the light pulse and/or
at least twice the inverse of an electronic bandwidth of the receiving unit and/or
such that the series of sub-pulses is shorter than the time between two successive surface point measurements.

9. The laser scanner or laser profiler according to claim 1, wherein the first fiber network comprises only single mode fiber devices.

10. A scanning method for generation of a point cloud by measuring object surfaces with a laser scanner or laser profiler, the method comprising:
determining distances to surface points by:
using light pulses as measurement light emitted towards the object surfaces into an emission direction variated by rotation about at least one axis,
receiving measurement light reflected from the object surfaces,
measuring the respective alignment of the at least one axis, and
measuring the respective distance to a surface point based on the received measurement light,
wherein determining the distances to the surface points further includes:
transforming a respective light pulse into a series of separated sub-pulses of different energies by a fiber based optical coupler and a fiber network, the fiber network:
including a fiber delay line, and
being integrated in an EDFA or YDFA doped-fiber amplifier,
providing at least part of the fiber delay line,
digitally sampling received sub-pulses,
selecting at least one of the sub-pulses having an energy yielding an electrical signal amplitude in the non-saturated range of a receiving unit, and
determining said respective distance based on deducing a time-of-flight of the at least one selected sub-pulse.

11. The method according to claim 10, wherein the series comprises at least a portion of successive sub-pulses of decreasing energies.

12. The method according to claim 10, wherein received sub-pulses of a respective light pulse are identifiable as originating of this same light pulse by their temporal spacing being well known.

13. The method according to claim 11, wherein received sub-pulses of a respective light pulse are identifiable as originating of this same light pulse by their temporal spacing being well known.

14. A computer program, which is stored on a non-transitory machine-readable medium, for controlling and/or carrying out the method according to claim 10, when the program is executed in a control and analysis unit of a laser scanner or laser profiler.

15. A computer program, which is stored on a non-transitory machine-readable medium, for controlling and/or carrying out the method according to claim 13, when the program is executed in a control and analysis unit of a laser scanner or laser profiler.

\* \* \* \* \*